Sept. 11, 1973   J. P. MANION   3,758,339
METHOD OF OPERATING FUEL CELL WITH HYDROGEN PEROXIDE OXIDANT
Filed Sept. 10, 1969
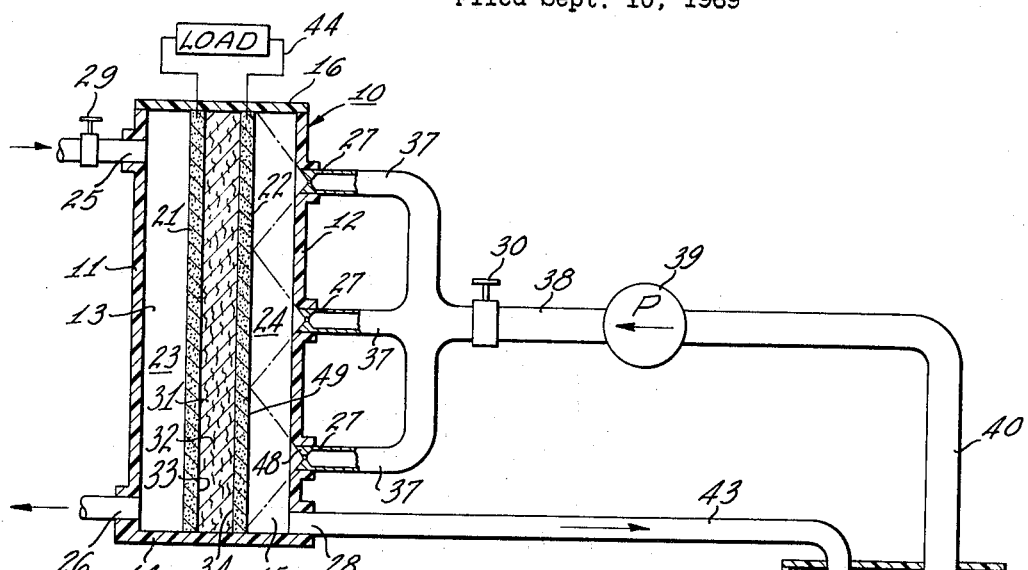
FIG. 1
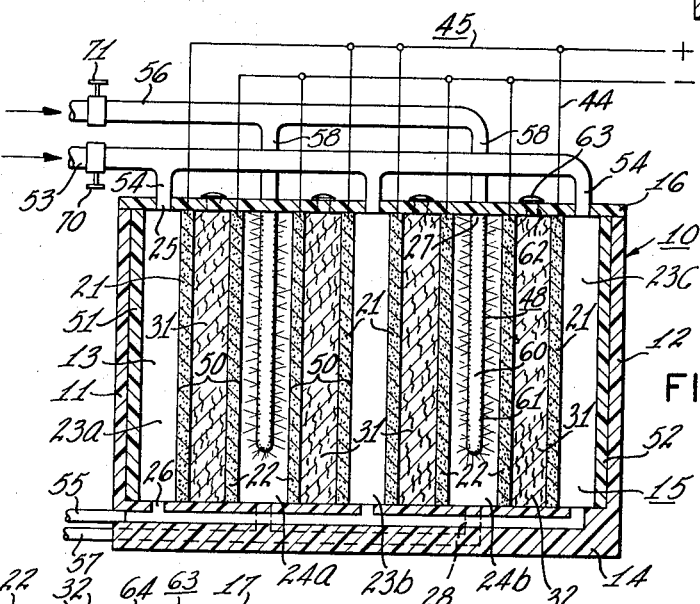
FIG. 2
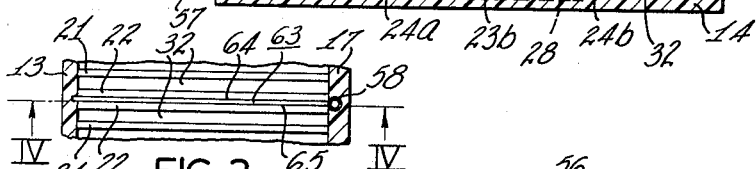
FIG. 3
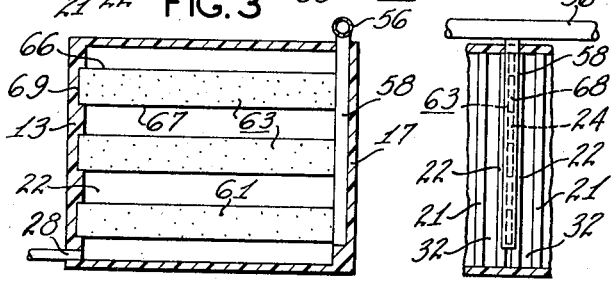
FIG. 4   FIG. 5
INVENTOR
JEAN P. MANION
BY Richard R. Mybeck
ATTORNEY 3,758,339
METHOD OF OPERATING FUEL CELL WITH HYDROGEN PEROXIDE OXIDANT
Jean P. Manion, Milwaukee, Wis., assignor to Allis-Chalmers Manufacturing Company, Milwaukee, Wis.
Continuation-in-part of application Ser. No. 639,589, Mar. 27, 1967, which is a continuation-in-part of application Ser. No. 366,934, May 7, 1964, which in turn is a continuation of application Ser. No. 111,516, May 22, 1961, all now abandoned. This application Sept. 10, 1969, Ser. No. 870,346
Int. Cl. H01m 27/30
U.S. Cl. 136—86 E
4 Claims

ABSTRACT OF THE DISCLOSURE

A method of operating a fuel cell with a liquid oxidant, hydrogen peroxide, wherein the hydrogen peroxide is sprayed against the surface of the fuel cell oxidant electrode. Excess hydrogen peroxide is permitted to run off the oxidant electrode surface to be collected and reused.

CROSS-REFERENCES TO RELATED APPLICATIONS

This application is a continuation-in-part of application Ser. No. 639,589 filed Mar. 27, 1967, now abandoned, which was a continuation-in-part of application Ser. No. 366,934 filed May 7, 1964, now abandoned. Application Ser. No. 366,934 was a continuation of application Ser. No. 111,516 filed May 22, 1961, now abandoned.

BACKGROUND OF THE INVENTION

This invention relates generally to the direct conversion of the free energy of a chemical reaction into electrical energy and more particularly to improved systems and components for realizing this conversion by devices known as "fuel cells."

Fuel cells are generally well known to the art and comprise relatively simple electrochemical devices for converting the free energy of various chemical reactions directly into electrical energy. Fuel cells are particularly interesting in that they avoid intermediary stages where energy must be expended to produce heat before producing power. Further, fuel cells do not require moving parts to produce electric power.

Recent publications dealing with the historical development of, as well as the current unsolved problems in, fuel cell technology include: "Status Report on Fuel Cells," by B. R. Stein, ARO Report No. I, June 1959, Office of Technical Services, United States Department of Commerce, PB 151804; "Fuel Cells," by G. J. Young, Reinhold Publishing Corporation (1960); and "Fuel Cells, Power for the Future," D. R. Adams et al., Graduate School of Business Administration, Harvard University (1960).

Of the unsolved problems currently being pursued, the most important include a reduction of power-to-weight and power-to-volume ratios as well as reduction of cost. Thus, a need exists for a compact high power output fuel cell unit which can produce power at a cost which is competitive with the $0.035 per kilowatt hour now obtainable by central utilities today using conventional methods of producing power.

SUMMARY OF THE INVENTION

The present invention is directed broadly to these problems and is specifically concerned with overcoming the serious difficulty encountered at the oxygen electrode of hydrogen-oxygen fuel cells. This difficulty has heretofore manifested itself grossly as a fall off in half-cell potential of the oxygen electrode on load. It has been attributed, variously, to concentration and activation polarization.

As will hereinafter appear, the present invention provides a more compact cell which permits more efficient power production per cell thereby significantly reducing its cost of operation. These results are predicated upon my discovery that fuel cell systems utilizing gaseous fuels such as hydrogen and the like obtain greatly enhanced electrical outputs when reacted in a compatible system, such as will be hereinafter described, with a liquid oxidant consisting essentially of hydrogen peroxide. I find that hydrogen peroxide, when used in accordance with the present invention, is chemically more reactive and provides a considerably more rapid cathodic reaction rate at ambient temperatures (at which it is proposed this fuel cell system may be operated) than does oxygen. The control of this reagent in a compatible fuel cell system is, as shall appear, another significant aspect of this invention.

Accordingly, one of the primary objects of the present invention is the provision of a fuel cell having a more reactive system whereby electrical power is more easily and cheaply produced.

Another object of the present invention is the provision of a fuel cell system in which the oxidizing reagent is liquid and provides more chemical energy per unit volume than has heretofore been obtained with gaseous oxidizing reagents.

Still another object of the present invention is to provide a fuel cell system utilizing a liquid oxidizing reagent and which provides more chemical energy per system weight than heretofore obtainable with systems employing gaseous oxidants and requiring massive housings to contain them.

Another object of the present invention is to provide a fuel cell system in which larger current densities for a given cathode potential are obtained and the limiting effect of the cathodic reaction heretofore characterizing hydrogen-oxygen cells is substantially eliminated.

A still further object of the present invention is to provide an improved and compatible system for converting the free energy of a reaction between a fuel and hydrogen peroxide directly into electrical energy.

These and still further objects as shall hereinafter appear are fulfilled by the present invention in a remarkably unexpected fashion as may be readily discerned from the following detailed description especially when considered in connection with the accompanying drawings in which:

BRIEF DESCRIPTION OF THE DRAWINGS

FIG. 1 is an elevation, partially schematic and partially in cross section, of a fuel cell and system embodying the present invention;

FIG. 2 is a side elevation, partially in cross section, of a fuel cell module embodying the present invention;

FIG. 3 is a fragmentary section looking down upon a portion of a fuel cell module embodying the present invention;

FIG. 4 is a section, taken along lines IV—IV, of the module shown in FIG. 3; and FIG. 5 is a fragmentary end section of the module of FIG. 4.

DESCRIPTION OF THE PREFERRED EMBODIMENT

Fuel cells embodying the present invention are shown in the drawing and shall now be described.

Referring to FIG. 1, the fuel cell therein illustrated comprises a housing 10 formed by spaced end plates 11, 12, interconnected by side walls 13, 17 (see FIG. 3) and mounted upon a base member 14 and cooperating therewith to define a chamber 15 which may be enclosed by a cover 16.

It is of course understood that housing 10, instead of comprising a plurality of discrete portions as described, may if desired, especially the chamber defining portions, be precast as a unitary structure.

A fuel electrode 21 and an oxidant electrode 22 are disposed in chamber 15 in spaced relationship to each other and spaced from end plates 11, 12, respectively. Electrode 21 coacts with end plate 11 and side walls 13, 17 to define fuel space 23 while electrode 22 coacts with end plate 12 and side walls 13, 17 to define an oxidant space 24.

Fuel inlet means 25 and fuel exit means 26 are disposed through housing 10 into communicative relationship with fuel space 23. Exit means 26 is preferably spaced from inlet means 25 to enhance the passage of fuel gas through the space 23.

In a similar manner, oxidant inlet means 27 and oxidant exit means 28 are disposed through housing 10 into communicative relationship with oxidant space 24. For reasons which shall hereinafter become apparent, oxidant exit means 28 are preferably disposed at the lowest level of oxidant space 24 although an outlet adjacent this level can prove satisfactory under certain circumstances.

Operatively interposed between electrodes 21, 22, and in reactive relationship thereto is an electrolyte 31.

Electrolyte 31 may, if desired, be a liquid disposed in a porous separator plate 32 which then carries electrolyte 31 and is wetted by it. When the porous separator plate 32 is employed as an electrolyte carrier, it preferably engages both electrodes 21, 22, in substantially complete surface-to-surface engagement so that electrolyte 31 wets both interfaces 33, 34, respectively disposed between separator 32 and electrodes 21, 22. As will appear, it is important that electrolyte 31 wet these surfaces of electrodes 21, 22 sufficiently to provide a moist but non-flooded condition on these surfaces.

Under certain conditions, it may be desirable to wetproof the fuel electrode plaque by treating it with a gas permeable, liquid impermeable wetproofing agent, such, for example, as Teflon and the like, whereby the electrode is rendered impermeable with respect to the liquid electrolyte while remaining permeable with respect to the gaseous fuel.

Oxidant inlet means 27 are each connected to conduit branch 37 which extends therefrom to manifold 38 which, in turn, is serially connected to a pump 39 and a riser pipe 40 immersed into a bath 41 of liquid oxidant disposed in preferably enclosed reservoir 42. A second conduit 43 connects oxidant exit means 28 to reservoir 42 and provides for the drainage of excess oxidant from oxidant space 24 to reservoir 42.

Pump 39 may be of any conventional type although a positive displacement type having an oxidizing resistant lining, such as of Teflon or the like, is preferred.

Each oxidant inlet means 27 preferably has an ejection means 48 operatively associated therewith for forcibly disposing liquid oxidant over the adjacent surface 49 of oxidant electrode 22.

Where, as in FIG. 1, a relatively large oxidant electrode area is employed, a plurality of ejection means 48 are desirable, one with each of the inlet means. It is of course understood that the precise number of ejection means employed may be varied depending upon the area of the surface to be covered. Thus, in the drawing, a plurality of ejection means 48, such for example as spray nozzles, extend through a corresponding number of inlet means 27 and forcibly eject a finely divided spray of liquid oxidant over surface 49. It has been found that if the ejection means are relatively centrally disposed relative to end wall 12, substantially complete coverage of the oxidant electrode 22 is achieved. Preferably, the liquid oxidant is ejected in a divergent slightly overlapping pattern to insure that the entire surface of the electrode receives oxidant.

Suitable valve means 29, 30, are respectively connected with fuel inlet means 25 and oxidant manifold 38 to control and regulate the quantity of fluids flowing therethrough.

If desired, each oxidant branch conduit 37 may also be valved and will provide an effective control of the oxidant electrode area employed at a given instant. This will in turn provide means for adjusting the output capacity of the cell.

Each electrode has a conductor 44 extending therefrom for connection into an external circuit 45 which, as in FIG. 1, contains a load which may be connected in series therewith for employing the power produced by the cell as useful work.

The spray or ejection means 48 are preferably fed liquid oxidant under a slight pressure when a spraying action is desired. Suitable means for effecting this action comprises pressure feeding means 48 through conduit 38 with pump 39 which draws liquid oxidant from bath 41 up through pipe 40 and pushes it through conduit 38, branches 37, and ejection means 48. Any excess oxidant that may run down oxidant electrode 22 is collected in the bottom of oxidant space 24 and drained away through oxidant outlet means 28 and conduit 43 back to bath 41 so as to preclude the reduction of electrode surface area which would result if the oxidant were permitted to build up in this area.

As contemplated by the present invention, the gaseous fuel may be any of the well known fuels such as hydrogen, hydrazine and those hydrocarbons and hydrocarbon derivatives which, in a vapor form, are capable of being oxidized by the fuel cell action to provide the desired electrical production.

In practical operation, hydrogen is preferred as the fuel and it is fed into the cell from a hydrogen supply tank (not shown) through fuel inlet 25 for engagement with fuel electrode 21 which preferably is catalyst activated to permit operation at ambient temperatures. A foraminous or porous nickel plaque treated with a catalyst selected from the group of platinum metals, i.e., platinum, palladium, iridium, osmium, rhodium and ruthenium are well recognized as hydrogen activating catalysts and may be employed in suitable amounts to provide the desired electrical characteristic. The techniques of preparing catalyst activated hydrogen electrodes are well known and need no further explanation here.

The gas space 23 is exhausted, as previously indicated, through fuel exit means 26. The exhausting gas carries with it any water vapor or other vaporous products which may have formed during the cell operations thereby preventing unnecessary dilution of the cell or blocking of fuel electrode surface. The exit gases may be passed through an appropriate water trap and reused as desired.

It has been discovered that the use of hydrogen peroxide as the oxidant in the above system in accordance with the present invention further obviates the need for treating the oxidant electrode with catalyst. Thus, electrode 22, which may be formed from a porous carbon plaque, provides an effective cell even when it carries no catalyst.

In the manufacture of the cell of FIG. 1 when a porous separator plate 32 is desired, it is found that porous minerals such as asbestos or the like provide quite satisfactory results. Suitable electrolytes for use with such plates include the hydroxides of potassium, sodium, lithium and the like.

Referring now to FIG. 2, a fuel cell module embodying the present invention is illustrated and shall now be described, like numerals being employed to identify portions corresponding to the single cell depicted in FIG. 1.

The module comprises a housing 10 having a first end plate 11, and a second end plate 12, interconnected by side wall 13 and a similar side wall (not shown) and mounted upon a bottom portion 14 to define a chamber 15 which may be enclosed by a top 16. Again, while housing 10 is more easily described as discrete elements, it is of course understood that several portions of it may be precast as a unitary structure when desired.

A plurality of fuel cells 50 are disposed in chamber 15, each comprising a fuel electrode 21, an oxidant electrode 22 having an electrolyte 31 reactively disposed therebetween as previously described.

To enhance the feeding system and electrical connection, adjacent cells are reversed so that electrodes of like polarity face each other across the space or compartment they define between them with the cooperation of the housing side walls. In this manner, a single fuel inlet can bring fuel to two cells and, similarly, a single oxidant can bring fuel to two oxidant electrodes.

As arranged in FIG. 2, the module (reading from left to right relative to the page) comprises, inter alia, a fuel space 23a, an oxidant space 24a, a fuel space 23b, an oxidant space 24b, and a third fuel space 23c. It is of course understood that the module may consist of any desired number of cells which may be connected electrically either in parallel or series depending upon the voltage and current outputs desired.

In the example shown, fuel space 23b and oxidant spaces 24a and 24b service two cells simultaneously. Because of the arrangement selected, fuel spaces 23a and 23c service only one cell, the other member coacting to define the respective spaces being associated with or a part of, as the case may be, of the adjacent end plates. The dead plates 51, 52 are preferably formed of a nonporous nonconductive material and several thermoplastics are known which provide admirable characteristics in this use.

A fuel inlet manifold 53 extends along a surface of the module and is connected to each of the gas spaces 23 by a branch 54 extending from the manifold 53 to fuel inlet means 25 in the housing 10 and hence into communication with each of the gas spaces. Each gas space 23 further includes exit means 26 which are in communication with a second or exhaust manifold 55 which also extends along the module, preferably adjacent a surface removed from the surface nearest inlet means 25 to enhance the passage of the fuel gas through each of the several fuel spaces. As previously indicated, the exhausting gas will carry much, if not all, of the reaction products from the cell where the impurities are removed as the gas is reused as desired.

An oxidant inlet manifold 56 likewise extends along the surface of the module and connects to the several oxidant spaces 24 as will be described. It has been found desirable to dispose both inlet manifolds 53, 56 adjacent a common surface of the module although this is not essential. When desired, the manifolding may even be precast into the module cover or embedded so as to provide a smooth surface for stacking.

Similarly, an oxidant exit manifold 57 is disposed adjacent the bottom of the module, precast therein if desired, and is in communication with each oxidant space 24 to drain excess oxidant therefrom before it can accumulate. The excess oxidant is returned to a reservoir (not shown) from whence it is returned as by a pump to the inlet manifold 56 through branches 58 tnd inlets 27 to the cells.

Associated with each oxidant inlet means 27 intermediate the facing oxidant electrodes 22 is an ejection or spray means 48 which, in this embodiment, comprises a depending tubular member 60 having a plurality of foramina 61 defined strategically along its length and facing a portion of the adjacent electrodes 22. As is apparent, the portion of the tubular member 60 which does not face one of the electrodes does not need to be perforated although, for expediency in manufacture, they may be if desired. In such instances, the oxidant discharged therefrom will deposit on the side walls and be guided thereby to oxidant exit means 28.

The electrolyte 31 is suitably disposed within each of the cells through means 62 defined through cover 16 and closable with caps 63 as by removing caps 63 and pouring the electrolyte through the opening 62. Again, as previously indicated, electrolyte 31 may be carried in a separator plate 32 formed of a suitable porous substance such as asbestos, or it may be retained within a chamber defined between facing surfaces of the electrodes adjacent thereto. In this latter instance, wetproofing of the electrode surfaces engaging the liquid electrolyte is desirable.

Each of the electrodes has an electrical conductor 44 extending therefrom and connected in parallel (as shown) or in series arrangement (if desired) whereupon the power produced thereby may be drawn for useful work.

Referring to FIG. 3 wherein a further embodiment of the present invention is illustrated, a plurality of oxidant electrodes extend transversely of chamber 15 between housing side walls 13, 17 and define an oxidant space 24 therebetween. Contiguous with oxidant electrodes 22 are porous separator plates 32 which, in turn, are disposed in abutting surface engagement with fuel electrodes 21.

Adjacent one side wall, for example, side wall 17, oxidant inlet manifold 56 is disposed and communicates with the separate oxidant spaces 24 through branches 58 which may be inset in the wall 17.

A plurality of thin elongated members 63 extend from branch 58 across oxidant electrode 22 in spaced generally parallel relationship to each other.

Each member 63 comprises two elongated rectangular side panels 64, 65 disposed in generally parallel relationship to each other and are connected by edge members 66, 67 whereupon a hollow chamber 68 is defined thereby which is closed at one end by an end wall 69 and joins at its other end into branch member 58. Both of the side walls have a multiplicity of holes defined therein whereupon the liquid oxidant from manifold 56 and branch 58 enters into the chamber and is ejected through the holes into engagement with the surface of the adjacent oxidant electrode 22. The liquid oxidant in the manifold is, as before, supplied from a suitable reservoir through a pump which imparts to the oxidant a pressure of from 1 to about 1½ pounds of presusre over atmospheric (the pressure in the oxidant chamber) to effect the passage of the oxidant into that chamber.

Suitable valves 70, 71 are again respectively disposed in fuel inlet manifold 53 and oxidant inlet manifold 56 for the purpose already described.

Each of the several members 63 operates in the same fashion. If desired, members 63 may be brought into abutting engagement with the facing oxidant electrodes so that, instead of a spraying action, a soaking action occurs. This latter arrangement is particularly desirable when the compactness of the unit being assembled is essential. Either way, however, the oxidant electrode, which, as previously indicated, is highly absorbent, is therefore readily saturable.

In all of the several embodiments disclosed, it is of course understood that suitable valving arrangements will be employed with the respective inlet manifolds to control the flow rate of fluids into the fuel cell.

The following examples of single cell units manufactured in accordance with and embodying the present invention with hydrogen fuel are presented to aid the reader attain a more complete understanding of the concepts herein involved and are not intended to impose limitations hereon beyond their coincidence of scope with the claims set forth below.

Example I

A fuel cell was constructed using as the fuel electrode a 1" x 1" x 0.028" porous nickel plaque upon which approximately 28 milligrams of palladium and 5 milligrams of platinum were deposited. The oxidant electrode was formed from a 1" x 1" x ⅛" porous carbon plaque and contained no catalyst. A 1/16" thick piece of asbestos was sandwiched between the electrodes and impregnated with an aqueous solution of 25 percent potassium hydroxide (KOH). Hydrogen gas at atmospheric temperature was utilized as the fuel and 50 percent solution of hydrogen peroxide ($H_2O_2$) was employed as the oxidant. Table I shows the electrical performance of this cell (ma. being milliamperes).

TABLE I

| Voltage | Ma. | Current, amps/ft.² |
|---|---|---|
| 0.97 | 0 | (¹) |
| 0.70 | 130 | 18.7 |
| 0.60 | 120 | 17.3 |
| 0.55 | 110 | 15.8 |

¹ Open circuit.

Example II

To effect a comparison of this cell with a standard hydrogen-oxygen fuel cell, the cell in Example I was operated with an oxygen gas being utilized as the oxidant. All other features of this cell remain the same as in Example I and the electrical performance of this cell is reported in Table II.

TABLE II

| Voltage | Ma. | Current, amps/ft.² |
|---|---|---|
| 0.88 | 0.0 | (¹) |
| 0.70 | 7.0 | 1.0 |
| 0.50 | 18.5 | 2.6 |

¹ Open circuit.

Example III

A fuel cell was constructed utilizing a fuel electrode identical with that employed in Examples I and II. The oxygen electrode was formed from a 1" x 1" x 0.060" porous nickel plaque upon which cobalt oxide was deposited for a catalyst. A 1/16" thick piece of asbestos was sandwiched between the electrodes and impregnated with an aqueous solution of 25 percent KOH. Hydrogen gas at atmospheric pressure was utilized as the fuel and a 50 percent solution of hydrogen peroxide was employed as the oxidant. Table III shows the electrical performance of this cell.

TABLE III

| Voltage | Ma. | Current, amps/ft.² |
|---|---|---|
| 0.8 | 188 | 27.1 |
| 0.7 | 310 | 44.6 |
| 0.6 | 440 | 63.3 |
| 0.5 | 510 | 73.4 |

Example IV

To effect a comparison of the cell of Example III with a standard hydrogen-oxygen fuel cell, the cell was operated with gaseous oxygen as oxidant, all other features of construction remaining the same as in Example III. The electrical performance of this cell is reported in Table IV.

TABLE IV

| Voltage | Ma. | Current, amps/ft.² |
|---|---|---|
| 1.08 | 0 | (¹) |
| 0.80 | 90 | 12.9 |
| 0.70 | 210 | 30.2 |
| 0.60 | 245 | 35.3 |
| 0.50 | 330 | 47.5 |

¹ Open circuit.

From the foregoing examples it is readily appreciated that a remarkably unexpected benefit is derived from using the cell of the present invention in that an eighteen-fold increase in electrical performance is obtained in the absence of oxidant electrode catalyst and a 150 percent increase in the presence of cobalt oxide oxidant electrode catalyst.

The following three examples illustrate the present invention's operability at concentrations down to 10 percent hydrogen peroxide, and with an anodic reactant of hydrazine, $N_2H_4$.

Example V

A fuel cell was constructed of two matched Lucite blocks machined so that when two electrodes and an ⅛" thick Lucite spacer were combined, a three compartment cell was achieved. The electrodes consisted of 1" x 1" x 0.019" porous nickel which has been rolled to the indicated thickness from 0.060". No other catalytic agent was used at either electrode. (It has been found efficacious to treat the cathode electrode after rolling by heating at 450° C. in air to produce a catalytic surface of nickel oxide. This treatment, though efficacious for hydrogen peroxide cathode electrodes, is very necessary for a high current-carrying cathode operating on oxygen.) The volume of the reactants and electrolyte compartments were 1" x 1" x ⅛". A 25 percent solution of KOH was used for the electrolyte, and a 64 percent solution of hydrazine, $N_2H_4$, was used as the anodic reactant and a 50 percent solution of hydrogen peroxide was employed as the oxidant. Table V shows the electrical performance of this cell.

TABLE V

| Voltage | Ma. | Current, amps/ft.² |
|---|---|---|
| 0.80 | 161 | 23.2 |
| 0.75 | 240 | 34.5 |
| 0.70 | 445 | 64.1 |
| 0.65 | 630 | 90.7 |

Example VI

A test identical to that shown in Example V was conducted except that a 25 percent solution of hydrogen peroxide was employed as the oxidant. Table VI shows the electrical performance of this cell.

TABLE VI

| Voltage | Ma. | Current, amps/ft.² |
|---|---|---|
| 0.80 | 240 | 34.6 |
| 0.75 | 300 | 43.2 |
| 0.70 | 350 | 50.4 |
| 0.65 | 375 | 54.0 |

Example VII

A test identical to that shown in Examples V and VI was conducted except that a 10 percent solution of hydrogen peroxide was employed as the oxidant. Table VII shows the electrical performance of this cell.

TABLE VII

| Voltage | Ma. | Current, amps/ft.² |
|---|---|---|
| 0.80 | 200 | 28.8 |
| 0.75 | 250 | 36.0 |
| 0.75 | 270 | 38.9 |
| 0.60 | 340 | 49.0 |

From the foregoing examples it is readily appreciated that hydrogen peroxide is an excellent oxidant for fuel cell applications.

Furthermore, from the foregoing description, it can be seen that a new fuel cell and system has been created which advances that art toward a commercially practicable goal and fulfills all of the aforestated objectives in a remarkably unexpected fashion.

It is of course understood that the embodiments herein described and illustrated are done so to exemplify my invention rather than limit it and that such modifications, alterations and applications as may occur to the artisan upon confronting this disclosure are intended within the spirit of this invention, especially as it is defined by the scope of the claims appended hereto.

The embodiments of the invention in which an exclusive property or privilege is claimed are defined as follows:

1. The method of operating a fuel cell of the type having a nonconsumable porous fuel electrode in spaced relation to a porous nonconsumable oxidant electrode selected from the group consisting of carbon and nickel and not carrying a noble metal catalyst and with each of said electrodes having a first surface and a second surface and containing means for an electrolyte between said first surface of said fuel electrode and said first surface of said oxidant electrode comprising the steps of: disposing an electrolyte consisting essentially of an aqueous solution of an alkaline metal hydroxide in said containing means; forming an electrolyte boundary interface at said oxidant electrode; directing a hydrogen containing fuel at a temperature in order of magnitude of atmospheric temperature into engagement with said second surface of said fuel electrode remote from said electrolyte containing means; and directing a solution containing hydrogen peroxide as the oxidant into engagement with said second surface of said oxidant electrode remote from said electrolyte containing means whereby said hydrogen peroxide contacts said electrolyte at said electrolyte boundary interface and reacts electrochemcially.

2. The method of operating a fuel cell in accordance with claim 1 wherein said hydrogen containing fuel is at a pressure in the order of magnitude of atmospheric pressure.

3. The method of operating a fuel cell having a porous nonconsumable fuel electrode in spaced relation to a porous nonconsumable oxidant electrode selected from the group consisting of carbon and nickel and not carrying a noble metal catalyst, each of said electrodes having a first surface and a second surface and means for containing an aqueous alkali hydroxide electrolyte interposed between said first surface of said fuel electrode and said first surface of said oxidant electrode, comprising the steps of disposing an aqueous alkaline hydroxide electrolyte in said containing means; forming a reaction boundary interface at each of said electrodes; directing hydrogen at a pressure in the order of magnitude of atmospheric pressure into engagement with said second surface of said fuel electrode, and soaking said second surface of said oxidant electrode remote from said electrolyte containing means with a solution of hydrogen peroxide, whereby said hydrogen contacts said electrolyte at said electrolyte boundary interface at said fuel electrode, and said hydrogen peroxide contacts said electrolyte at said electrolyte boundary interface at said oxidant electrode and an electrochemical reaction takes place.

4. The method of operating a fuel cell in accordance with claim 3 wherein said hydrogen is at a temperature in the order of magnitude of atmospheric temperature.

References Cited

UNITED STATES PATENTS

| | | | |
|---|---|---|---|
| 553,719 | 1/1896 | Olan | 136—83 |
| 567,721 | 9/1896 | Payson, Jr. | 136—86 |
| 2,384,463 | 9/1945 | Gunn et al. | 136—86 |
| 2,912,478 | 11/1959 | Justi et al. | 136—86 |
| 2,615,932 | 10/1952 | Marko et al. | 136—136 X |
| 2,706,313 | 4/1955 | Lucas | 136—154 X |
| 2,991,412 | 7/1961 | Kordesch | 136—136 X |

OTHER REFERENCES

Handbook of Chemistry & Physics, 25 ed., Chemical Rubber Publishing Co., Cleveland, Ohio. July 1941, pp. 1335, 1336.

Direct Current, September 1952, p. 34.

ALLEN B. CURTIS, Primary Examiner

U.S. Cl. X.R.

136—86 R